(12) United States Patent
Niblett et al.

(10) Patent No.: US 6,370,335 B1
(45) Date of Patent: Apr. 9, 2002

(54) FLASH UNIT FOR 3D PHOTOGRAPHY

(75) Inventors: Timothy Bryan Niblett, Glasgow; Paul William Cockshott, Lanark, both of (GB)

(73) Assignee: C3D Limited, Glasgow (GB)

( * ) Notice: Subject to any disclaimer, the term of this patent is extended or adjusted under 35 U.S.C. 154(b) by 0 days.

(21) Appl. No.: 09/466,937

(22) Filed: Dec. 20, 1999

(30) Foreign Application Priority Data

Dec. 21, 1998 (GB) .............................................. 9828118

(51) Int. Cl.[7] .............................................. G03B 15/03
(52) U.S. Cl. ...................................... 396/182; 396/322
(58) Field of Search ............................... 396/4, 14, 61, 396/62, 155, 180, 182, 322, 431; 359/27, 28, 34, 15, 22, 462, 463, 619; 430/262, 263, 289

(56) References Cited

U.S. PATENT DOCUMENTS 3,598,467 A * 8/1971 Pearson ...................... 359/27
5,136,312 A    8/1992 Weaver et al. ................. 396/61
5,365,354 A * 11/1994 Jannson et al. ................ 359/15
5,390,084 A    2/1995 Ohtake et al. ................. 362/16
5,606,455 A * 2/1997 Eichenlaub ................. 359/463
5,612,786 A * 3/1997 Huber et al. ................ 356/376
5,642,293 A    6/1997 Manthey et al. .............. 702/42
5,708,860 A    1/1998 Nonaka et al. ................ 396/28
5,952,148 A * 9/1999 Sawyer ........................ 430/262

FOREIGN PATENT DOCUMENTS

DE      25 04 908        8/1976
DE      196 33 868 A1    4/1998
GB      2 257 250 A      1/1993

* cited by examiner

Primary Examiner—David M. Gray
Assistant Examiner—Rochelle Blackman
(74) Attorney, Agent, or Firm—Foley, Hoag &Eliot, LLP

(57) ABSTRACT

A flash unit comprising a flash light source (2) and a projector lens (8) positioned to project light from the flash source onto a subject. In a preferred embodiment there are two flash light sources for projecting patterned and unpatterned light respectively on to the subject, and a circuit is provided to trigger the two flash sources with a predetermined time interval therebetween.

16 Claims, 3 Drawing Sheets

FLASH UNIT FOR 3D PHOTOGRAPHY

This invention relates to the field of three-dimensional digital image capture, and more particularly, three-dimensional image capture of people using digital stereo photogrammetry. Digital stereo photogrammetry is a technique for the recovery of the three-dimensional attributes of an object by the use of pairs of digital photographs, typically, but not necessarily, taken by a pair of cameras. Provided that the positions, orientations and focal properties of the cameras used to take the images are known, it is possible for a computer to estimate the distance between either of the cameras and an object appearing in the images taken by both of them.

The computer does this by determining which group of contiguous pixels in an image taken with the second camera match up with a pre-specified group of contiguous pixels in an image taken with the first camera. From this, a parallax can be computed, and from that, using simple geometry, the distance to the object, light from which produced these pixels, can be derived.

The ability of a computer to correctly match corresponding areas of the images from the two cameras is dependent upon there existing, within each area, significant variations in image intensity. If an area of an object is visually 'flat', that is to say, of uniform visual intensity, then there will be potential for ambiguity in determining the position of matching points on the two images. Such visual flatness normally arises because an object or subject being imaged is lit by a uniform source of illumination and has areas on their surface or on their skin which differ little in albedo.

In principle the uniformity of image intensity can be obviated in two ways. One can change the albedo of the surface, for example by painting patterns with make-up on a person's face, or alternatively, one can vary the intensity of illumination across the surfaces being imaged.

For certain applications it is convenient to capture both the three-dimensional shape of an object and its associated visual texture, for instance when capturing both the appearance and three-dimensional shape of an actor's face. This makes the use of visually disruptive makeup unattractive. The alternative of illuminating the subject with textured light is used in known systems such as the Turing C3D system.

Drawbacks of the State of the Art

The state of the art technique for illuminating a subject with textured light involves the use of a slide projector which is set to produce a focused image of a random dot pattern on the face of the subject. The process involves taking an initial pair of images using textured light, a subsequent third image is then taken with the slide projector illuminating the subject through a uniform gray slide. The third image, having been taken using uniform light intensity can be used to reconstruct the subject's skin tone in the ultimate computerised three-dimensional model.

Whilst this approach produces reasonably good three-dimensional models it does suffer from a number of practical disadvantages. One of these is that the subject has to stare into a bright light coming from the projector. To allow for sufficient depth of field the aperture of the projector must of necessity be small. Intense illumination subtending a small angle of the field of view of the eye has recently been brought under various international health and safety regulations which render the legality of such a system questionable. Whether safe or not the experience of staring into an intense light is unpleasant for the subject and does not facilitate the capture of natural and relaxed expressions.

Since the duration of the exposure is not well controlled, there is a danger that the infrared loading on the retina from the high intensity lamp in the slide projector may exceed safe limits. A second drawback is the imperfect registration between the textured and white light images consequent upon slight movements by the subject during the second or so that it takes to switch between textured and white slides. A third disadvantage relates to the bulk and power consumption of slide projectors. These are typically heavy devices requiring main power for their operation. This precludes their being mounted on photographic tripods, or being incorporated into a portable system.

The Invention

This invention, which is defined in the appended claims, seeks to obviate the above disadvantages of the state of the art. It consists of a high depth of field flash projector, preferably battery powered, This has the advantages over a standard slide projector for three-dimensional image capture of people using digital stereo photogrammetry that the energy delivered in a flash can be precisely calibrated and it is possible to ensure that this falls below a level that might pose a danger to the retina of the subject.

The intensity of light during the instant of the camera's exposure can be far greater than the intensity of a practical continuous light source even though the total energy delivered to the subject is substantially less than from a continuous source. This facilitates smaller apertures providing greater depth of field and also allows the projection optics to cover a wider angle than is practical with a continuous source. This means that the overall volume required for a three-dimensional capture system and subject can be substantially reduced.

Because a high level of illumination only has to be maintained for a few milliseconds, power to the projector can be derived from a battery making the system portable. The flash projector is light-weight and can be mounted on photographic tripods.

BRIEF DESCRIPTION OF THE DRAWINGS

An embodiment of the invention is illustrated in the drawings, in which.

Figure 1:
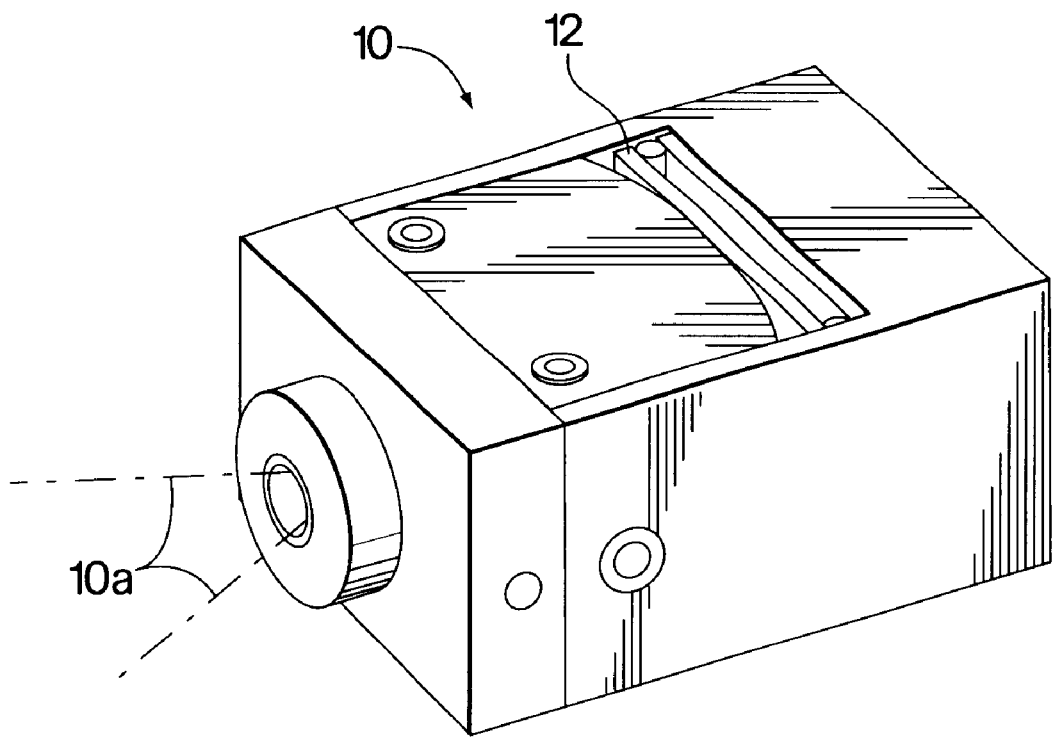
FIG. 1 is a perspective view of part of a flash unit forming one embodiment of the invention.
Figure 2:
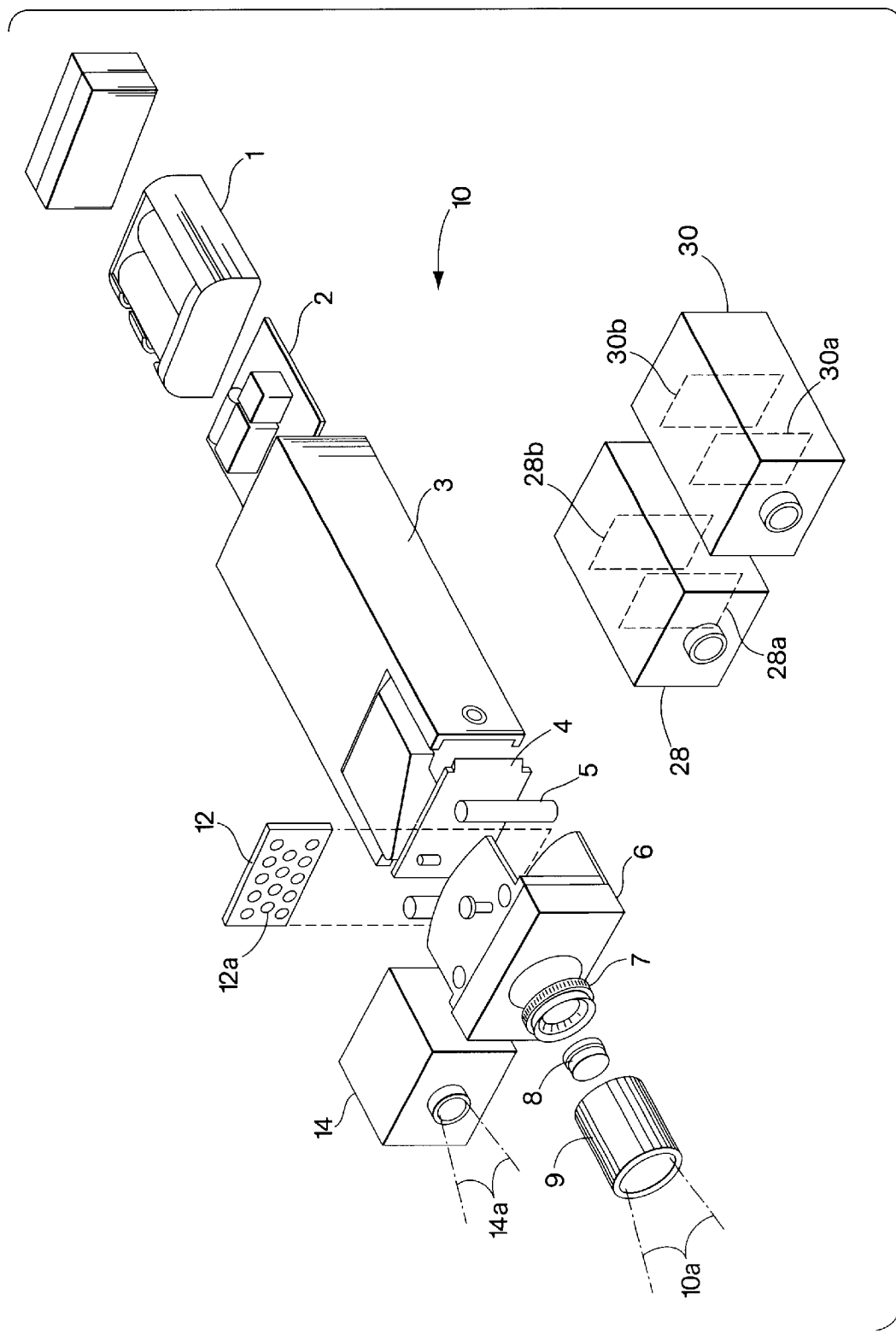
FIG. 2 is an exploded view of the flash unit of FIG. 1.

The components of flash unit 10 of FIG. 1 are labeled in FIG. 2 and are as follows:

1. Battery sub-assembly
2. Control electronics+flash tube
3. Housing with mounting points on the underside for fitting to standard photographic tripods
4. Holographic diffuser and fresnel lens
5. Mounting posts for bending the slide
6. Front block with curved rear edge to enforce a curve on the slide
7. Aperture disk
8. Lens
9. Lens Barrel It is an objective of the design to achieve a high depth of field within which the projected texture is in focus on the face of the subject. This is achieved in the preferred embodiment by the use of:

An Aspheric doublet lens 8 which prevents chromatic aberration over the necessarily wide acceptance angle; an aperture of F5 or greater;

and a curved slide 12. Curvature of the slide 12 means that the relative focal distance between the centre of the slide 12 and the horizontal extremes can be reduced, thus increasing the depth of field over a wider area at short focal length.

The slide 12 is bent into position by hand and retained in place by the combination of the curvature on the rear edge of the front blocks and the posts 5 acting against the elasticity of the plastic slide case. This eliminates the need for any other slide retention mechanism and so reduces the cost of manufacture of the product. A standard 35 mm plastic slide case is used. Preferably lithographic films or metal deposit on transparent substrates with a random dot pattern, such as pattern 12a shown in FIG. 2, are inserted in the slide cases to ensure high contrast.

The combination 4 of a holographic diffuser and a fresnel lens is a particularly suitable way of achieving uniform illumination of the slide 12, but other means may be used for this purpose.

Figure 3:
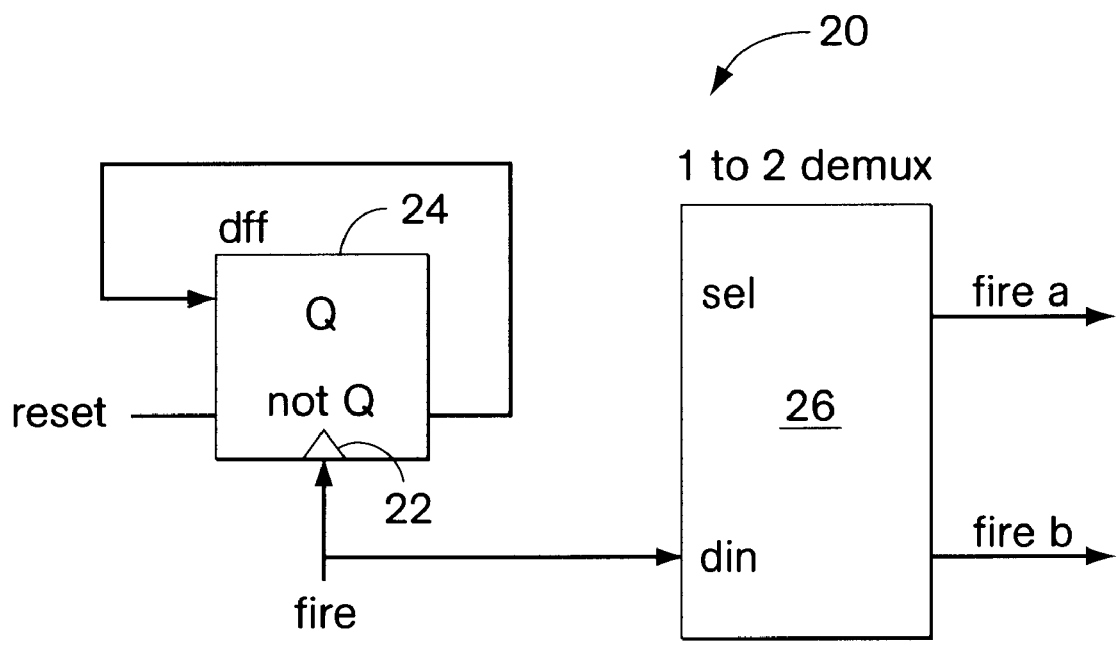
FIG. 3 is a block diagram of an auxiliary trigger mechanism which may be used in a modification of the embodiment.

In a preferable extension to the design, additional control electronics 20 capable of triggering an auxiliary un-textured flashgun 14, as illustrated in FIG. 3, are provided.

The input signal to the flash unit 10 is shown as fire, and the outputs from the auxiliary trigger mechanism 20 are firea and fireb. Firea triggers the textured flash unit, or projector 10, fireb triggers untextured flash gun 14. A reset input is also provided. The fire input is taken to the clock input 22 of an edge triggered d type flip flop 24. The negated output (not Q) of the flip flop 24 is fed back into the flip flop 24, causing it to take on alternating 0 and 1 values on successive rising edges of the clock signal. The output of the flip flop 24 is directed to the select input (sel) of a 1 to 2 demultiplexer 26, whose data input (din) is provided by the original fire signal. The consequence is that alternate low going edges of fire pulses are directed to firea and fireb. If the two flash guns 10, 14 are designed to trigger on a low going pulse then the circuit is so arranged that successive fire impulses to the auxiliary trigger mechanism cause the textured and un-textured flash units 10, 14 to fire in alternation. This allows the subject to be illuminated with two flashes in quick succession, the first being textured (10a) and the second un-textured (14a) or vice-versa. Cameras 28, 30 capture images for each flash. The delay between flashes can be arranged to be very short ensuring that only a minimal amount of movement by the subject can occur between capture of three-dimensional information (via the textured flash 10a) and capture of skin tones (via the un-textured flash 14a).

In a preferable extension to the design, the auxiliary trigger unit 20 and the un-textured flash 14 are incorporated with the flash projector 10 into a single physical unit.

An alternative embodiment would preferentially filter the textured flash to pass a wavelength blocked by a filter 28a in the spectrum recorded by the camera 28 used for the color information, while the stereo information was recorded by camera(s) 30 suitably filtered to accept the wavelength of the textured flash. In a preferred embodiment of this type a notch-pass filter 30a in the green portion of the visible spectrum would be used corresponding to a notch-blocking filter 28a in the color recording camera 28. The color gamut of the color recording camera 28 need not be significantly compromised by this notch since the color process of any color gamut requires interpolation of hue between the pass filters of the camera sensor.

The isolation between the textured flash pattern and the color record could be further enhanced by arranging that the textured flash 10a and the un-textured flash 14a for the color record were polarized at right angles, and providing suitable polarizing filters 28b, 30b for the relevant cameras 28, 30. This would not be able to isolate the two flashes by polarization alone as the skin would scatter and rotate the polarization angle to the extent that the isolation would be substantially reduced. However since very narrow color filters are expensive, a combination of relatively low cost polarization filters 28b, 30b and broader band notch color filters 28a, 30a may in some circumstances provide a substantial reduction in cost for the same effective isolation.

While a pass filter beyond the visible spectrum is a possible alternative this embodiment is not preferred since the three-dimensional information would be compromised by the penetration through the skin of infrared light. The alternative of ultraviolet light has a very low reflectivity from skin and has the additional disadvantage of causing fluorescence in many clothing fabrics which may reduce the precision of the projected texture pattern and also cause the texture fluorescence to become visible to the color record. However, in the standard embodiment using the flip-flop mode, such fluorescence may in some circumstances, as for recording body parts where fabric was not present, be profitably exploited to enhance the contrast of the texture pattern on a subject by applying an invisible fluorescent makeup to the subject. This embodiment would require UV transparent optics to be used in the flash projector.

It is frequently desirable to use a number of pairs of cameras, each pair with its own flash system. The flash unit of the invention may be provided with a photosensor on its front face for slave operation in response to triggering of a first flash unit. Slave flash systems are known per se.

What is claimed is:

1. A flash unit comprising:
    a first flash light source;
    a projector lens positioned to project light from the first flash source onto a subject;
    means provided to project a pattern onto the subject;
    a second flash light source for projecting unpatterned light onto the subject; and
    circuit means for triggering the first and second flash light sources with a predetermined time interval between them.

2. A flash unit according to claim 1, in which the projector lens is dimensioned and positioned to give a depth of field to maintain a focus of the pattern over a three-dimensional feature of the subject.

3. A flash unit according to claim 2, in which the projector lens has an aperture number of F5 or greater.

4. A flash unit according to claim 2 in which said depth of field approximates the depth of a human head.

5. A flash unit according to claim 1, in which said means to project a pattern comprises a holder for a photographic transparency.

6. A flash unit according to claim 5, in which said holder is arranged to hold the transparency in a curve.

7. A flash unit according to claim 5, including optical means for transmitting the light from the first flash source to the transparency as relatively uniform illumination across an area of the transparency.

8. A flash unit according to claim 5, in which said optical transmission means comprises a diffuser and a fresnel lens in series.

9. A flash unit according to claim 8, in which the diffuser is a holographic diffuser.

10. A flash unit according to claim 1, in which said predetermined interval is of a duration to prevent appreciable movement of the subject.

11. A flash unit according to claim 1, arranged as a readily portable unit including an internal battery pack.

12. A method of capturing a digital three-dimensional representation of a three-dimensional object, which includes the steps of projecting upon the object first and second light flashes separated by a time interval, one of the light flashes being arranged to project a predetermined pattern in such a manner as to give a depth of field at the object to maintain a focus of the pattern over the object, and the other light flash being unpatterned.

13. The method of claim 12, in which said time interval is of a duration to prevent appreciable movement of the object.

14. A flash unit comprising a first light source, and a projector lens positioned to project light from the first light source onto a subject including means provided for projecting a pattern onto the subject and a second light source for projecting unpatterned light onto the subject, and circuit means for triggering said first and second light sources to operate simultaneously in cooperation with a pair of cameras, the flash unit including means to project patterned and unpatterned light in different spectral wavebands.

15. A flash unit according to claim 14 in combination with a pair of cameras, the second flash source being arranged to project substantially white light, the first flash source projecting substantially monochromatic light preferably chosen from one of infrared and ultraviolet light, and one of the cameras being provided with a notch pass filter and optionally combined with a polarised filter for said substantially monochromatic light.

16. Apparatus for capturing a digital 3-D representation of a 3-D object, said apparatus comprising:

projecting means for projecting upon the object first and second light flashes separated by a time interval, said first light flash being arranged to illuminate the object with a beam having a predetermined pattern, said second flash being arranged to illuminate the object with an unpatterned beam, and timing means for controlling the projecting means to project the first and second light flashes a predetermined time apart.

* * * * *